United States Patent [19]

Morgan

[11] 3,800,026
[45] Mar. 26, 1974

[54] METHOD FOR PREPARING SODIUM CHLORIDE BRINE

[75] Inventor: George J. Morgan, Ossining, N.Y.

[73] Assignee: Stauffer Chemical Company, New York, N.Y.

[22] Filed: Apr. 6, 1971

[21] Appl. No.: 131,744

[52] U.S. Cl............. 423/179, 23/270 R, 23/272.6, 423/499
[51] Int. Cl........................ B01d 11/02, C01d 3/08
[58] Field of Search............ 23/312 AH, 272, 272.6, 23/89, 270, 310, 311; 423/499

[56] References Cited
UNITED STATES PATENTS

| | | | |
|---|---|---|---|
| 3,343,919 | 9/1967 | Miller | 23/312 AH |
| 3,363,995 | 1/1968 | Driskell | 23/312 AH |
| 2,395,258 | 2/1946 | Drake | 23/312 AH |
| 3,080,220 | 3/1963 | Lagatski | 23/312 AH |
| 3,168,379 | 2/1965 | Miller | 23/312 AH |
| 3,130,016 | 4/1964 | Grier | 23/312 AH |
| 2,281,140 | 4/1942 | Courthope | 23/312 AH |
| 3,365,280 | 1/1968 | Heiss | 23/312 AH |
| 3,071,450 | 1/1963 | Martin | 23/312 AH |
| 3,385,674 | 5/1968 | Kolasinski | 23/312 AH |
| 2,734,804 | 2/1956 | Courthope | 23/312 AH |
| 2,058,300 | 10/1936 | Cramer et al. | 23/311 |
| 3,307,914 | 3/1967 | Heiss et al. | 23/311 |
| 3,334,973 | 8/1967 | Goren et al. | 23/311 |

Primary Examiner—Norman Yudkoff
Assistant Examiner—S. J. Emery
Attorney, Agent, or Firm—Wayne C. Jaeschke; Daniel S. Ortiz; Martin Goldwasser

[57] ABSTRACT

An improved process for preparing brine by passing a liquid upwardly through a bed of salt the improvement which comprises removing a slurry of brine and particulate matter from the bottom of the dissolving vessel, separating at least a portion of the particulate matter from the brine stream and returning the separated brine to the dissolving vessel at a point below the salt bed.

4 Claims, 1 Drawing Figure

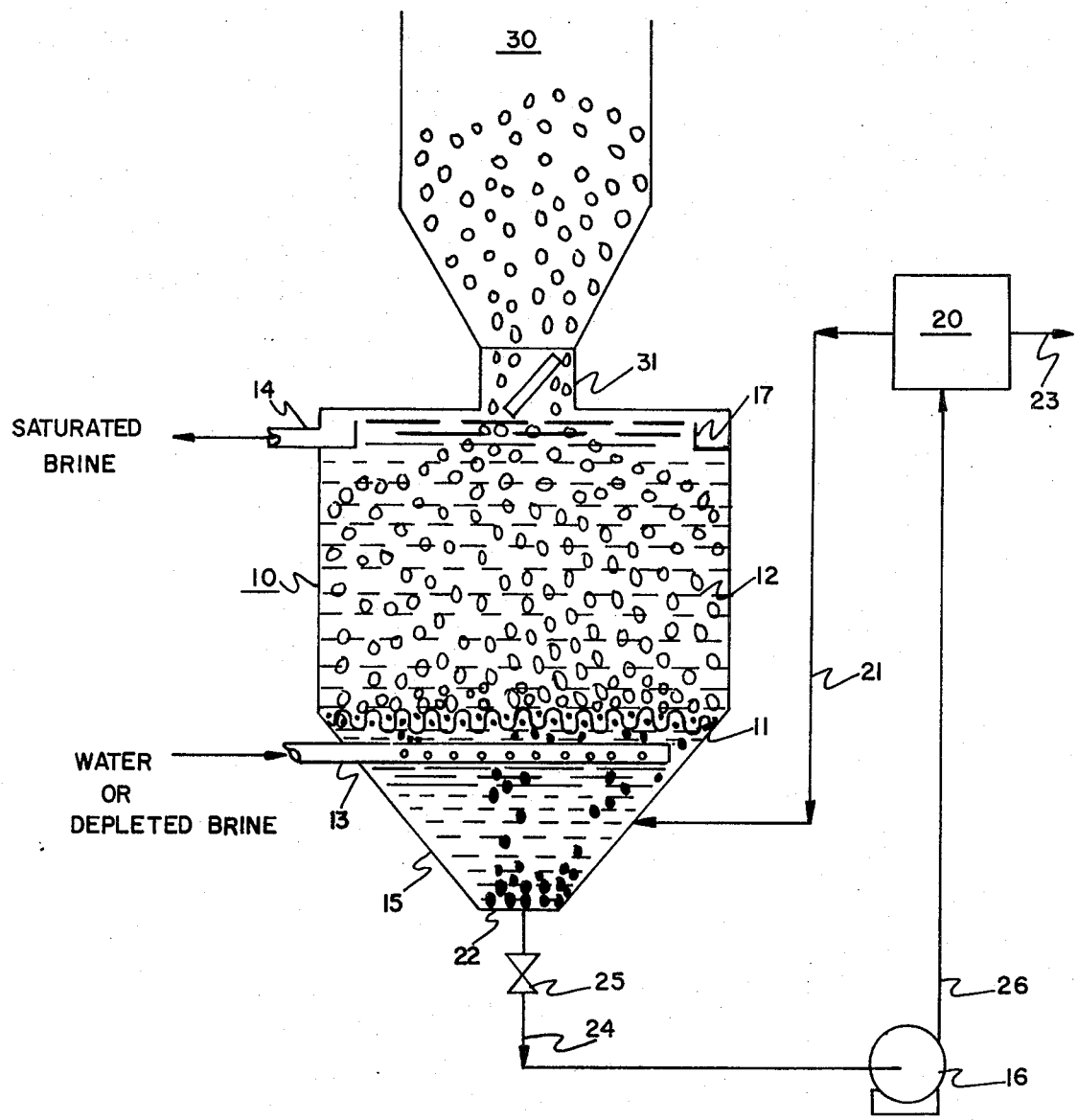

METHOD FOR PREPARING SODIUM CHLORIDE BRINE

BACKGROUND OF THE INVENTION

This invention relates to an improved method for preparing sodium chloride brine from a contaminated supply of material such as run-of-mine rock salt. More particularly, the present invention relates to an improved method of separating the insoluble and the relatively insoluble portion of the rock salt from the brine solution.

The major soluble impurity in rock salt is the mineral anhydride the anhydrous form of calcium sulfate ($CaSO_4$). The maximum solubility of calcium sulfate in saturated sodium chloride brine under ordinary temperatures and pressures is about 5.5 grams per liter of brine. In equipment for commercial production of sodium chloride brine, the amount of sodium sulfate contamination may be expected to range from about 1.45 to about 4.4 grams per liter of saturated brine. The reduction of the concentration of calcium sulfate below the maximum solubility is achieved by reason of the fact that calcium sulfate is more slowly soluble in aqueous solution than is sodium chloride. It is then possible, to effect a semi-isolation of the brine and the calcium sulfate so that periodic batch discharge of the semi-isolated calcium sulfate may be used to effect some measure of brine purity.

In practice, brine is prepared by supporting a bed of rock salt in a large tank. Water or depleted brine is admitted beneath the support for the salt bed and slowly flows upwardly through the rock salt bed. The water or depleted brine to be saturated dissolves the salt while passing upwardly through the bed. Insoluble impurities and the slowly soluble calcium sulfate migrate down through the bed countercurrent to the flow of water or depleted brine as the lower portion of the bed is dissolved and settle out at the bottom of the tank below the liquid inlet.

The bottom of the tank is preferably but not necessarily fabricated in the form of a cone so that the insoluble and slowly soluble particles are concentrated in the conical portion. The solids are periodically flushed from the system as a 3 to 10 percent solid slurry in the concentrated brine. The large amount of brine which must be removed from the system along with the solid particles presents a loss in sodium chloride values and becomes a pollutant in the area surrounding the plant.

It is the obJect of the present invention to provide a process with improved salt utilization efficiency. It is a further object of the present invention to reduce the amount of brine discharged with the solid materials flushed from the system. It is also an object of the present invention to provide a system for the continuous withdrawal of solid materials from the dissolving tank. Another object of the present invention is to reduce water pollution by decreasing the amount of brine discharged with the undissolved components of the rock salt.

BRIEF SUMMARY OF THE INVENTION

The foregoing objects are achieved in accordance with the present invention by providing a dissolving tank having supported therein a stationary bed of salt which is contacted by a relatively slowly moving upward flow of solution. The insoluble impurities and slowly soluble components migrate down through the salt bed as the lower portions of the bed are dissolved by the upward flowing solution and are concentrated in the bottom of the dissolving tank. The present invention provides a means for withdrawing the solids-brine slurry from the lower section of the dissolving tank, passing the slurry to a means for separating at least a portion of the solids from the slurry, discharging the solids separated and returning at least a portion of the slurry back to the lower section of the dissolving tank below the salt bed whereby to mix with additional solid material.

DETAILED DESCRIPTION OF THE INVENTION

FIG. 1 is a diagrammatic view illustrating the method of the present invention. The system is designed to primarily remove the solid impurities which have not dissolved in the brine solution. The impurities include calcium sulfate and any non-soluble impurites which can sink to the bottom of the saturating vessel. The manner in which the soluble materials are removed from the brine system with only minor losses of brine solution can be seen from the study of FIG. 1. In FIG. 1, bin 30 contains a supply of rock salt for maintaining the level of rock salt bed 12 in dissolving vessel 10. The rock salt feed can be restricted by means of flow valve 31, but the rock salt feed is usually controlled by the level of rock salt in the bed. Dissolving vessel 10 contains rock salt support 11 which is a supported wire mesh screen having a sufficient number of meshes to support the salt bed. Inlet and distribution means 13 which can be a perforated pipe for admitting the solution into the dissolver below the salt bed, collector means 17 for collecting the brine from the salt bed and outlet means 14 for removing the brine from the dissolver, conical bottom 15 for concentrating the particles not dissolved in the upward flowing solution, outlet 22 connected to pumping means 16 by means of conduit 24 containing valve means 25 conduit means 26 between pumping means 16 and separating means 20 and conduit means 21 connected between separating means 20 and the conical bottom of dissolver 10. The separated liquid effluent from said separating means 20 is admitted to the cone bottom of dissolver 10 at a point below the salt bed but sufficiently high so that the returning liquid will not prevent the solid particles from settling in the conical bottom. The effluent containing the solids is discharged from the system through conduit 23 and may be stored in storage facilities not shown for final disposal.

The dissolver, pumping means, and separating means are fabricated of corrosion resistant material to withstand the action of the brine solutions and are usually made of rubber lined steel or plastic materials.

The means for separating the undissolved materials from the brine solution can be any means which are conventionally utilized to separate solid from liquid materials, such as centrifuges, filters, and liquid cyclones. In the prior art, a solution containing about 5 percent solid material and 95 percent brine was usually discharged from the system to purge the undissolved solids from the system. Utilizing a filter or a centrifuge, a mixture comprising about 80 to about 95 percent solid material and 5 to 20 percent brine can be discharged from the system. Utilizing a liquid cyclone a slurry consisting of about 30 to about 70 percent solid material and about 70 to about 30 percent brine can be discharged from the system. Although a liquid cyclone does not produce a liquid effluent free of solids or a solid effluent containing only minor amounts of brine, due to its simplicity and ease of operation a liquid cyclone is the preferred method for removing the solid particles from the brine solution. A liquid cyclone can be readily fabricated from corrosion resistant materials.

A liquid cyclone is a well known apparatus and is illustrated in *Chemical Engineers Handbook*, 4th Ed., McGraw Hill, New York, 1963, pages 21–54 and 55 and 21–59 and 60.

When operating the dissolver without the solids separation means a 5–10 percent solids slurry will be discharged to the waste effluent system. When a liquid cyclone is utilized a 30 to 70 percent slurry of solids in brine will be discharged from the system. It is clear that about 900 pounds of a brine solution can be saved for each 50 – 100 lbs. solids discharged from the system. This represents an increased salt efficiency and a substantial decrease in the amount of salt which must be discharged in a waste stream. Even higher efficiencies can be achieved when centrifuges or filters are utilized to achieve the separation.

In addition, the solution which is returned to the bottom of the dissolver becomes saturated with the slowly soluble sulfate materials. This more concentrated sulfate solution would retard the solution of the sulfate in the conical bottom of the saturator and thus provide more solid calcium sulfate for removal in the liquid solid separation means.

The solution returning to the dissolver from the separation means should enter the dissolver in such a manner that the settling of the particulate matter is not unduly impeded. The returning solution is usually admitted below the entry point of the liquid feed to the dissolver and sufficiently high in the cone to prevent the particulate matter from being resuspended.

The slurry can be discharged from the dissolver continuously or batchwise and fall within the purview of the present invention.

As used herein, brine denotes a water solution of sodium chloride which contains minor amounts of salts of magnesium, calcium and various other soluble impurities found in rock salt. Saturated brine is used herein to denote the brine which has contacted the salt and has an increased concentration of salt over the solution which entered the dissolving tank.

The temperature and pressure of operation of the dissolver is not critical but it is usually the custom to operate these systems at from about ambient temperatures up to about 85° C. at atmospheric pressure.

The rock salt bed must be designed in such a manner that at the capacity of the dissolver the liquid flow rates are sufficiently low to prevent the salt and undissolved material from being carried from the bed with the flow of the brine solution.

The rock salt bed must at least be of sufficient depth to permit the brine solution to reach the desired concentration, on passing through the bed.

The process of the present invention will be illustrated by reference to the following example.

EXAMPLE 1

Bin 30 of FIG. 1 is charged with rock salt containing about 1.0 percent $CaSO_4$. Valve 31 is opened and the salt bed in dissolver 10 is permitted to build slowly until the salt ceased flowing. The valve is left open and the salt replenishes the bed as the bed is dissolved. The dissolver 10 is of a design substantially the same as shown in FIG. 1. Depleted brine at a rate of 505,000 pounds per hour is admitted to dissolver 10 through line 13 and 519,410 pounds per hour of saturated brine containing 22 pounds of $CaSO_4$ is removed through line 14. A slurry of $CaSO_4$ in brine in the amount of 15,806 pounds per hour is continually removed from the dissolver through opening 22 and circulated to separating means 20 (a liquid cyclone) by pump 16. A slurry in the amount of 190 pounds per hour containing 66 pounds per hour of brine and 124 pounds per hour of $CaSO_4$ is discharged as sludge from the liquid cyclone and a stream of 15,616 pounds per hour of brine containing 22 pounds of $CaSO_4$ is recirculated to the dissolver through line 21. Salt in the amount of 14,600 pounds per hour is utilized as feed to the dissolver.

What is claimed is:

1. In a process for preparing a sodium chloride brine by passing a liquid of low sodium chloride concentration upwardly through a bed of sodium chloride particles in a contacting vessel having a conical bottom wherein the sodium chloride is dissolved and solid insoluble and slowly soluble particles are permitted to fall to the bottom of the contacting vessel, and removing a slurry of the solid materials in the brine from a point near the lower end of the conical bottom of the contacting vessel, the improvement which comprises separating at least a portion of the solid materials from the brine to form a composition having a higher concentration of solids than the slurry and returning the brine to the conical bottom of the contacting vessel at a point below the liquid feed and above the slurry removal.

2. The process of claim 1 wherein the solid material is separated from the brine by means of a liquid cyclone.

3. The process of claim 1 wherein the solid material is separated from the brine by means of a filter.

4. The process of claim 1 wherein the solid material is separated from the brine by means of a centrifuge.

* * * * *